United States Patent Office 3,632,635
Patented Jan. 4, 1972

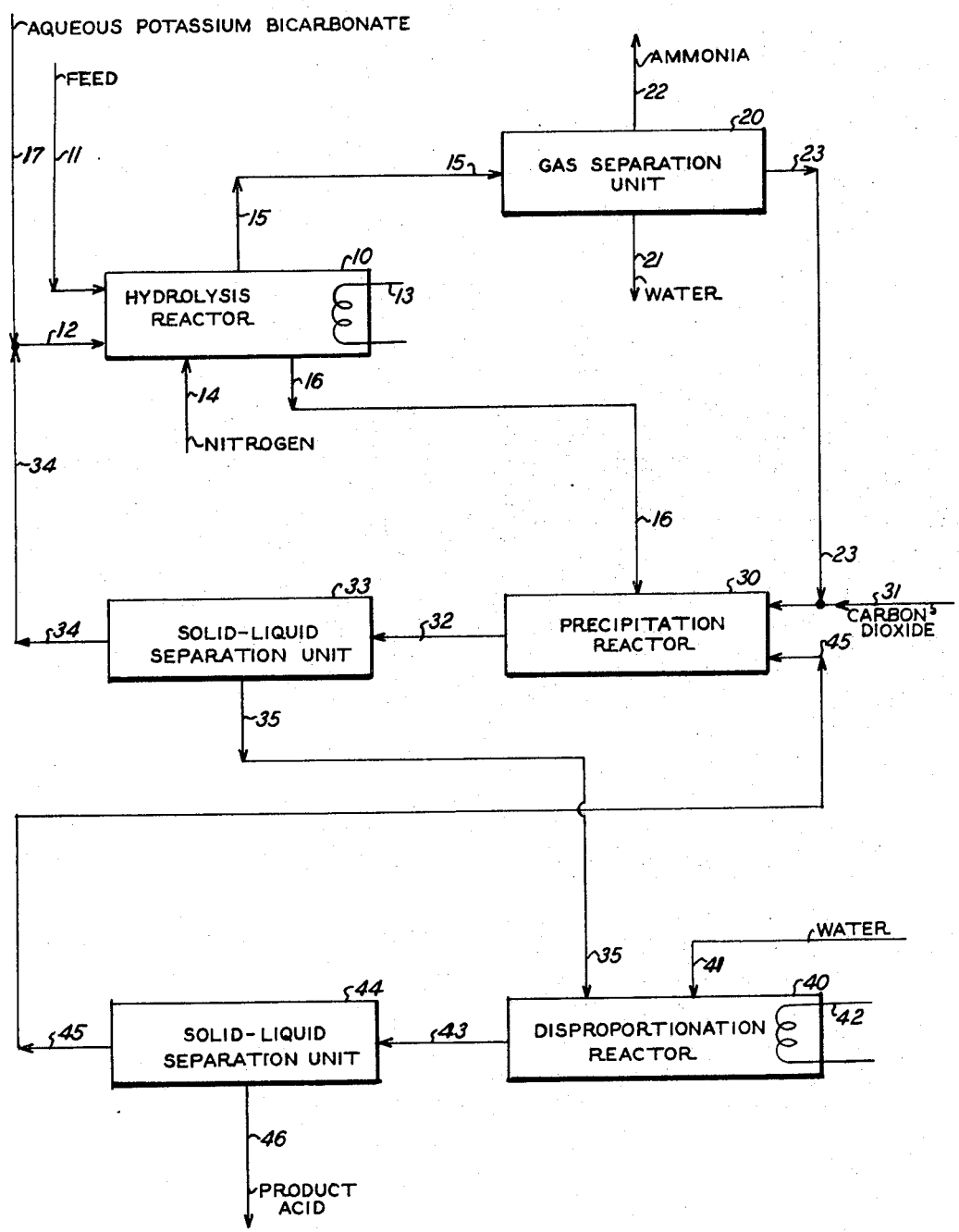

---

3,632,635
AROMATIC DINITRILE CONVERSION PROCESS
Charles N. Winnick, Teaneck, N.J., and Joseph Pugach, Bronx, N.Y., assignors to Halcon International, Inc.
Filed Sept. 1, 1966, Ser. No. 578,959
Int. Cl. C07c 63/26
U.S. Cl. 260—515 P                                    7 Claims

---

ABSTRACT OF THE DISCLOSURE

Aromatic dinitriles are converted to the corresponding diacids by a process which comprises hydrolyzing the dinitrile in the presence of an alkali metal bicarbonate, removing the ammonia and carbon dioxide from the hydrolyzate, reacting the disalt-containing hydrolyzate with carbon dioxide to form a precipitate of the alkali metal monosalt of the diacid and a mother liquor containing the diacid salts and alkali metal bicarbonate, separating the precipitate from the mother liquor, recycling the mother liquor to the hydrolysis steps, disproportionating the precipitate to form free diacid and alkali metal disalt of the diacid, separating the diacid from the disalt, recycling the disalt, and recovering the diacid.

---

This invention relates to the conversion of nitriles to free acids, especially, to the hydrolysis of aromatic polynitriles to the corresponding polyacids. Specially, this invention relates to the hydrolysis of terephthalonitriles to produce high yields of the corresponding terephthalic acid.

The demand for aromatic diacids, notably the terephthalic acids, is increasing rapidly, particularly for use in fiber manufacture. It is well recognized in the art that the obtention of high purity diacids is extremely difficult since even minor amounts of contaminants seriously interfere with the utilization of the product. The process of this invention permits product diacids of extremely high purity, suitable for use in polymer manufacture, to be obtained.

One known and convenient starting material for the manufacture of diacids is the corresponding dinitrile, which is in turn made from the analogous polyalkyl substituted aromatic. Conversion of polyalkyl substituted aromatics to dinitriles is conveniently carried out by a process known as a ammoxidation, i.e., by the simultaneous reaction of the polyalkyl substituted aromatic with ammonia and oxygen. One such ammoxidation process, capable of producing dinitriles in high yield, is carried out in the presence of a solid catalyst maintained in a fluidized state by the gaseous reactants entering the reaction vessel, as disclosed and claimed in U.S. patent application Ser. No. 533,237, filed Mar. 10, 1966 now U.S. Pat. No. 3,497,545. Such a fluidized solid ammoxidation process typically employs a catalyst comprising vanadium and antimony deposited on a suitable support.

Processes for the hydrolysis of nitriles to the corresponding acids are also known to the art. One such process typically involves refluxing the nitrile in the presence of aqueous sodium hydroxide to produce the sodium salt of the corresponding acid, which is subsequently converted to the free acid by acidification of the salt with sulfuric acid. Such processes, however, produce by-product sodium sulfate, which presents waste disposal problems. At this time of evermore stringent limitations on the amount of pollutants that can be released from a chemical process into the surroundings, this is a serious drawback. It is an advantage of the process of this invention that no waste products are obtained. Moreover, this advantage is realized without sacrifice either in yield or in product purity.

In accordance with this invention, the nitrile is hydrolyzed in the presence of an aqueous solution of an alkali metal bicarbonate whereby the nitrile is converted to form the alkali metal disalt of the diacid corresponding to the dinitile starting material. In this reaction carbon dioxide and ammonia are also produced and these materials are removed from the hydrolyzate before further processing is conducted. The hydrolyzate, containing the alkali metal disalt is then reacted with carbon dioxide, whereby the alkali metal disalt of the diacid is converted to the monosalt. Since the alkali metal monosalts of the aromatic para-diacids to which this process is applied are far less soluble in aqueous media than are the disalts, the monosalt precipitates substantially as fast as it is formed. Hence, as a result of the carbon dioxide treatment, a two-phase system is formed, a solid phase containing the alkali metal monosalt and an aqueous, mother liquir, containing unconverted alkali metal disalt of the diacid and alkali metal bicarbonate. The solid phase containing the alkali metal monosalt is then separated from the mother liquid and is subjected to a disproportionation reaction wherein the monosalt is converted to free acid and to additional disalt. The free acid is even more insoluble than the monosalt, while the disalt is quite soluble in comparison to both the monosalt and to the acid. Hence, the product from the disproportionation reaction can readily be separated into the free acid in high purity and into the relatively soluble disalt.

As used hereinabove, and as will be used in the following more detailed description of this invention and in the claims, the following terms have the following, unless otherwise stated:

"Aromatic dinitrile" (more simply referred to as "nitrile")—monocyclic aromatic compounds containing as ring substituents two nitrile (i.e., —C≡N) groups in a para relationship to each other.

"Aromatic diacid" (or simply "diacid")—a monocyclic aromatic compound containing as ring substituents two carboxy groups (i.e., the —COOH group) in a para relationship to each other.

"Alkali metal disalt of a diacid" (more simply referred to as "disalt")—the alkali metal salts of the corresponding diacid wherein both of the dissociatable hydrogen atoms in the carboxyl groups have been replaced by alkali metal cations, i.e., wherein the aromatic ring nucleus contains two —COOM substituents, where M is an alkali metal cation.

"Alkali metal monosalt of a diacid" (or "monosalt")— a diacid containing one —COOM radical and one carboxy group, wherein M has the meaning given hereinabove.

The following chemical equations describe the overall reaction chemistry of a process in accordance with our invention. In these equations terephthalonitrile and potassium bicarbonate are used as illustrative, although this invention is not limited thereto.

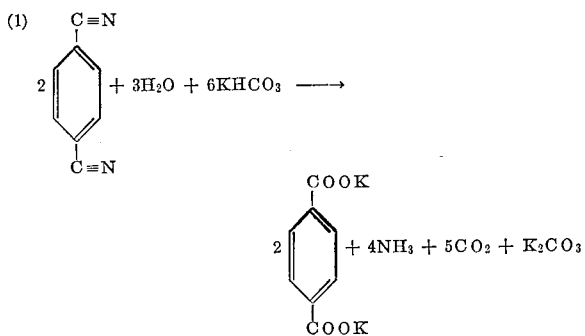

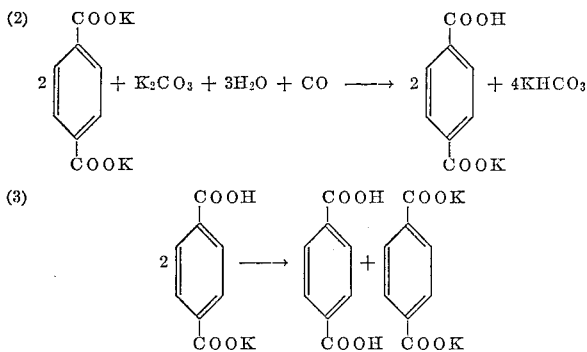

For convenience in the following detailed discussion of the invention, the reaction of Equation 1 above will be referred to as "hydrolysis"; the reaction of Equation 2 above will be referred to as "precipitation" and the reaction of Equation 3 will be referred to as "disproportionation."

The process of our invention is applicable to a variety of aromatic para-dinitriles, illustratively terephthalonitrile, 2 - methyl - 1,4 - phenylenedinitrile and other mono- or dialkyl substituted phenylenedinitriles wherein the alkyl substituents have no more than 3 carbon atoms apiece, e.g., 2,5-dimethyl-1,4-phenylenedinitrile and 2-methyl-6-ethyl-1,4-phenylenedinitrile. In a particularly preferred embodiment of our process, the nitrile is terephthalonitrile.

In each case, the resultant diacid is the one corresponding to the nitrile starting material, i.e., the diacid has the identical carbon skeleton as the nitrile. Thus, when starting with terephthalonitrile, terephthalic acid is the end product and 2-methyl-1,4-phenylenedinitrile gives 2-methylterephthalic acid.

Any of the alkali metal bicarbonates can be used in our process, viz, the bicarbonates of lithium, sodium, potassium, rubidium and cesium. Francium, while it is also an alkali metal and is chemically utile in our process, is radioactive and is therefore not desirable in the practice of our invention. Of the above alkali metal bicarbonates, we prefer to employ the bicarbonates of sodium and potassium as these are the least expensive and most readily available ones. Potassium bicarbonate is especially preferred since the potassium disalts of the diacids are more soluble than are the corresponding sodium disalts.

HYDROLYSIS

The reaction of the aromatic dinitrile with the alkali metal bicarbonate to produce the alkali metal disalt (hydrolysis) is conducted in the liquid phase in the presence of sufficient water to dissolve at least the majority of the resulting disalt product. Ammonia and carbon dioxide are evolved. The alkali metal disalt of the diacid corresponding to the dinitrile starting material is obtained. The hydrolysis reaction is carried out at temperatures between about 100° C. and about 250° C. Preferred hydrolysis reaction temperatures are between about 150° C. and 200° C. Reaction pressures will vary depending upon the temperature and the mode of operation, but are sufficient to maintain a liquid phase hydrolysis reaction medium. Thus, reaction pressures range from the autogenous pressure of the system to some higher pressure which can be as high as 500 p.s.i. above the vapor pressure of water at the reaction temperature, or even higher.

Normally, unconverted disalt from the precipitation reaction will be recycled to the hydrolysis reaction together with other unconverted nitrile derivatives. "Nitrile derivatives" as used hereinbelow include the nitrile starting material, the acid product (which will normally be present in the hydrolysis reaction only in very small amounts, if at all), the alkali metal salts of the acid and intermediate hydrolysis products, such as, for example, the monocyanobenzoic acid or its alkali metal salt.

The ratio of alkali metal bicarbonate to nitrile derivative in the hydrolysis reaction should be controlled within careful limits. Generally, the molar ratio of the alkali metal bicarbonate to the nitrile and nitrile derivatives should be within the range of from about 1:1 to about 5:1 and we prefer to employ a ratio from about 2:1 to about 3:1.

It should be recognized that molar ratios of alkali metal bicarbonate to the nitrile and nitrile derivatives in the hydrolysis reaction in excess of 5:1 are operative but seem to afford little advantage in results over those obtained by operation within the aforesaid range of ratios.

The concentration of nitrile and nitrile derivatives present in the hydrolysis reaction medium can be from about 5 to about 40% by weight. However, it is preferred to employ concentrations within the range from about 15% to about 25% by weight. Hydrolysis reaction times (i.e., residence times in the reactor) can be as short as 10 minutes or as long as desired. It is preferred to employ hydrolysis residence times between about 30 minutes and about 8 hours. Reaction times longer than about 8 hours seem to give little advantage.

The ammonia and carbon dioxide formed during the hydrolysis reaction can be removed after the hydrolysis reaction is completed. Such removal can be effectuated by any means known to those skilled in the art, such as, for example, by distillation at atmospheric pressure after completion of the hydrolysis reaction. However, it is preferred to remove the ammonia and carbon dioxide as they are formed and thus it is preferred that reaction pressure be maintained at or slightly above the autogenous pressure of the system, i.e., within 50 p.s.i. thereof. Such removal, in this preferred manner of operation, is carried out by open steam injection or by injection of an inert gas such as nitrogen during the hydrolysis reaction. For this purpose, from about 1 to about 50 standard cubic feet (abbreviated "s.c.f." and measured at one atmosphere total pressure and 60° F.) of steam or inert gas per hour can be injected per part by weight of nitrile plus nitrile derivative contained in the hydrolysis reaction medium. Higher injection rates can be used but have little advantage and substantially increase process expense. Lower injection rates can also be used; however, this can result in incomplete removal of the ammonia and carbon dioxide, thereby requiring an additional carbon dioxide and ammonia removal step after the completion of the hydrolysis reaction.

The ammonia and carbon dioxide removed during or after the hydrolysis reaction is completed are separated by means known by those skilled in the art, such as, for example, by cryogenic distillation or by absorptive distillation techniques. The recovered ammonia is advantageously recycled to the ammoxidation reaction whence the dinitrile is derived. The carbon dioxide product is used in the precipitation reaction. Water recovered in this separation can advantageously be recycled to the hydrolysis reaction.

The aqueous effluent from the hydrolysis reaction contains the alkali metal disalt and may also contain unconverted alkali metal bicarbonate and/or alkali metal crbonate and/or unconverted nitrile. The effluent can be homogeneous or heterogeneous in the sense that, depending on the temperatures and concentrations used in the hydrolysis, it can contain some solid material. Desirably, if solid materials are present, they are separated as, for example, by filtration or centrifugation, and returned to the hydrolysis reaction. The homogeneous alkali metal disalt solution obtained in this manner can be fed directly to the precipitation step without further processing. Alternatively and desirably, the alkali metal disalt solution is purified by contacting it with an adsorbent such as, for example, kaolin, diatomaceous earth or activated carbon. Activated carbon is preferred. When activated carbon is used, suitable residence times for this treatment step range from about 0.5 hour to about 3 hours. Suitable temperatures range from about 20° C. to about 100° C. and the pressure is held at a level sufficient to maintain liquid phase throughout this treatment operation.

PRECIPITATION

The hydrolyzate, obtained as described above, is then subjected to a precipitation reaction wherein the alkali metal disalt present in the hydrolyzate is converted to the alkali metal monosalt by contacting the disalt solution with carbon dioxide. Advantageously and desirably, the carbon dioxide employed in this precipitation reaction is that obtained from the gases liberated in the hydrolysis reaction. Additional carbon dioxide make-up may be required and this can be readily supplied in known manner.

The disalt concentration in this precipitation reaction is desirably between about 1 percent by weight and about 30 percent by weight and preferably between about 15 and about 30 percent by weight. If necessary, the hydrolyzate can be subjected to a concentration step or diluted as required to achieve concentrations within the desired range. Precipitation reaction temperatures range from above about 0° C. to about 100° C. and preferably range from about 20° C. to about 50° C. Reaction pressure is sufficient to maintain liquid phase throughout the precipitation reaction. Carbon dioxide partial pressure can very between about 15 p.s.i.a. to about 500 p.s.i.a. It is preferred to employ carbon dioxide partial pressures between about 20 p.s.i.a. and 75 p.s.i.a. Precipitation reaction times (or residence times in the precepitation reactor) can vary between 1 minute and 120 minutes, with reaction times of from about 5 minutes to about 30 minutes being preferred. In this manner between about 45 and about 65% of the total alkali metal disalt present in the feed to the precipitation reaction precipitates in the form of the alkali metal monosalt.

The alkali metal monosalts are substantially less soluble in aqueous media than are the disalts. Therefore, as a result of this reaction there is formed a slurry of the alkali metal monosalt in a mother liquor which contains unconverted alkali metal disalts and alkali metal bicarbonate. The effluent from the precipitation reaction is then subjected to a solid-liquid separation as, for example, by centrifugation or filtration. Hydrocyclones are also suited for this separation. The mother liquor, containing unconverted disalt and alkali metal bicarbonate, is recycled to the hydrolysis reaction. The solid separated from the mother liquor is then subjected to a disproportionation reaction.

DISPROPORTIONATION

The disproportionation reaction results in conversion of a portion of the monosalt to the free acid and to the disalt. The free acid is substantially less soluble in aqueous media than are either the disalt or the monosalt. Thus, separation of the free acid from the other components of the disproportionation reaction effluent can readily be accomplished by known methods, such as, for example, by centrifugation or filtration.

The disproportionation reaction is advantageously conducted by contacting the monosalt with hot water. From about 3 to about 100 parts by weight of water per part by weight of monosalt can be used to effect this disproportionation, with from about 15 to about 100 parts by weight of water per part by weight of monosalt being preferred. Where less than the preferred amount of water is used per part of monosalt, a multi-stage disproportionation can be employed to ensure that the desired product acid purity is obtained, such as, for example by subjecting the monosalt to a plurality of hot water treatments, each using fresh water. Preferred disproportionation reaction temperatures are between about 50° C. and about 150° C. The pressure is held at a level sufficient to maintain a liquid phase throughout the reaction. Preferred disproportionation reaction times (or residence times) vary between 2 minutes and about 120 minutes. The disproportionation reaction can be conducted, for example, by passing hot water through the filtration or centrifugation apparatus used to separate the monosalt from the mother liquor in the precipitation reaction after the mother liquor has been removed. Alternatively, the disproportionation reaction can be conducted by forming a suspension of the monosalt in hot water at the desired temperature and then agitating the suspension for the desired contact times as specified hereinabove. As a result of this treatment there is formed a water insoluble phase and a water soluble phase. The water isoluble phase is essentially pure free acid. The water soluble phase contains unconverted monosalt and disalt. The water soluble phase is conveniently recycled to the precipitation reaction, whence additional monosalt is formed.

Yields of free acid in this disproportionation reaction are as high as 85% of the theoretical or even higher. Thus, yields across the disproportionation reaction exceed 40 mol percent on a once-through basis.

Overall yields of dinitrile to free acid, taking recycles into account, readily exceed 90% of the theoretical. If even higher product purities are desired, the free acid may be subjected to a reprecipitation. However, even without such reprecipitation, product purities in excess of 99% are readily obtained.

The process of this invention will be more fully explained in conjunction with the attached drawing which is a schematic representation of one embodiment thereof. For purposes of illustration, but without intending any limitation upon the scope of this invention, the feed to the process as illustrated in the figure is assumed to be trephthalonitrile and the alkali metal bicarbonate is assumed to be potassium bicarbonate.

Terephthalonitrile, prepared by the ammoxidation of paraxylene, is fed to hydrolysis reactor 10 via conduit 11. Also admitted to reactor 10 via conduit 12 is a recycle stream obtained in a manner which will be described hereinbelow. This recycle stream contains aqueous potassium bicarbonate and dipotassium terephthalate. Make-up aqueous potassium bicarbonate solution is added, as required, to the recycle stream in conduit 12 via conduit 17. The dipotassium terephthalate contained in the recycle stream to conduit 12 is essentially an inert in this reaction except that the molar ratio of potassium bicarbonate to nitrile derivative, as set forth hereinabove, is computed taking this terephthalate content into account.

Reactor 10 is maintained at an elevated temperature suitably about 170–180° C. by steam coils 13 within reactor 10. During the course of the hydrolysis reaction the terephthalonitrile is hydrolyzed and ammonia and carbon dioxide are formed. Also, potassium bicarbonate is converted to potassium carbonate. The gaseous reaction products are advantageously stripped from the hydrolysis reaction medium, or hydrolyzate in reactor 10, substantially as fast as they are formed, by the injection of nitrogen, as an inert gas, into the bottom of the reactor via conduit 14.

The gaseous by-products, ammonia and carbon dioxide, together with some water vapor, are removed from reactor 10 via conduit 15 and sent to gas separation unit 20. In this gas separation unit, which is suitably a cryogenic distillation system, ammonia, carbon dioxide and water are separated from one another. Water is withdrawn from the gas separation unit 20 via conduit 21 and can be recycled through suitable conduits (not shown) to hydrolysis reactor 10 or the water can be discarded. Ammonia is withdrawn from gas separation unit 20 via conduit 22 and is recycled to the ammoxidation reaction system for use in preparing additional terephthalonitrile. Carbon dioxide is withdrawn from gas separation unit 20 via conduit 23 and is sent to precipitation reactor 30.

The aqueous hydrolyzate is withdrawn from hydrolysis reactor 10 via conduit 16 and sent to precipitation reactor 30. This hydrolyzate comprises dipotassium terephthalate and potassium carbonate and can also contain some unreacted potassium bicarbonate and/or terephthalonitrile. Also sent to the precipitation reactor 30 is a recycle stream obtained from a point subsequent in the process in a manner described hereinbelow. This recycle stream, containing primarily dipotassium terephthalate and some monopotassium terephthalate, is admitted to precipitation reactor 30 via conduit 45.

In precipitation reactor 30 dipotassium terephthalate and potassium carbonate are contacted with carbon dioxide, obtained from gas separation unit 20 via conduit 23, resulting in their conversion to monopotassium terephthalate and potassium bicarbonate. Additional carbon dioxide make-up, if needed to compensate for handling losses, is added to that in conduit 23 via conduit 31. Monopotassium terephthalate precipitates, being substantially less soluble in aqueous media than dipotassium terephthalate. As a result, a slurry of a solid consisting essentially of monopotassium terephthalate in a mother liquor containing potassium bicarbonate and dipotassium terephthalate is formed. This slurry is drawn off from precipitation reactor 30 via conduit 32 and sent to solid-liquid separation unit 33.

Solid-liquid separation unit 33, which can be, for example, a centrifuge, preferably of the solid bowl continuous discharge type or a filter press of the plate and frame type or of the rotary scraped surface type is used to separate the monopotassium terephthalate slurry, or solid phase, from the mother liquor phase containing dipotassium terephthalate and potassium bicarbonate. The aqueous mother liquor phase is withdrawn from solid-liquid separation unit 33 via conduit 34, which communicates with conduit 12 thereby permitting the mother liquor phase to be recycled to hydrolysis reactor 10. The solid phase, consisting essentially of monopotassium terephthalate, is conveniently washed, in situ, with water (preferably from 0.1 to 10 parts of water per part by weight of monopotassium terephthalate) and the wash water is added to the mother liquor phase. The washed, solid monopotassium terephthalate is withdrawn from solid-liquid separation unit 33 via conduit 35 and sent to disproportionation reactor 40.

In disproportionation reactor 40, the monopotassium terephthalate is contacted with hot water and thereby converted to a mixture comprising free terephthalic acid, dipotassium terephthalate and some unconverted monopotassium terephthate. Water is added to disproportionation reactor 40 via conduit 41. The disproportionation reactor and its contents are maintained at an elevated temperature by suitable means, such as steam coil 42 or by externally heating the water in conduit 41 by suitable means (not shown) to a temperature in excess of that desired in the disproportionation reactor and thereby sufficiently heating the contents of the reactor. Alternatively, a combination of these two methods for obtaining the desired temperature in reactor 40 can be used.

The free terephthalic acid is but sparingly soluble, even in hot water, and therefore free terephthalic acid precipitates substantially as fast as it is formed in this disproportionation reactor 40. Monopotassium terephthalate is more soluble in water than terephthalatic acid and dipotassium terephthalate is quite soluble in water. As a result, during the disproportionation reaction there is formed a slurry consisting essentially of terephthalic acid and an aqueous phase containing dissolved mono- and dipotassium terephthalate. This slurry is withdrawn from disproportionation reactor 40 via conduit 43 and is sent to solid-liquid separation unit 44 which is, for example, a centrifuge or a filter press of the same type as is solid-liquid separation unit 33. In solid-liquid separation unit 44 the free terephthalic acid is separated, washed and withdrawn as product via conduit 46 and sent to storage. The aqueous phase containing dissolved mono- and dipotassium terephthalate is withdrawn from solid-liquid separation unit 44 via conduit 45 and returned to precipitation reactor 30.

By this method terephthalonitrile is readily converted to free terephthalic acid in high yields without the formation of any by-product, all side products being used in the course of the hydrolysis reaction except for the ammonia which is used in the ammoxidation reaction for the manufacture of the nitrile.

The following examples are presented to further illustrate this invention but are not intended as limiting the scope thereof. Unless otherwise stated, all parts and percents in the following examples are by weight.

EXAMPLE I

A mixture of 64 parts of terephthalonitrile, 150 parts of potassium bicarbonate and 500 parts of water is charged to a one-liter autoclave. The mixture is heated for 2 hours at 175° C. in a closed system during which time the pressure rises to over 400 p.s.i.g. due to the formation and evolution of carbon dioxide and ammonia. Pressure is then released. A stream of nitrogen at 150 p.s.i.g. is then passed through the system at a rate of 3.5 s.c.f. per part of nitrile per hour for 2.5 hours to strip out the ammonia and carbon dioxide. Water is added periodically to replace the amount removed in this stripping operation. After cooling, analysis of the effluent, which is a homogeneous solution at room temperature, for nitrogen showed that 98.7% of the total nitrile nitrogen is converted to the potassium carboxylate groups (i.e., $COO^-K^+$). This example illustrates one embodiment of the hydrolysis reaction conducted as a batch operation.

EXAMPLE II

A solution containing 121 parts of dipotassium terephthalate and 60 parts of potassium carbonate in 459 parts of water is agitated in the presence of carbon dioxide, with carbon dioxide partial pressure being maintained at 21 p.s.i.g., for one hour at 20° C. The pressure is released and the effluent is filtered to recover solid monopotassium terephthalate as a filter cake. The filter cake is then removed and re-suspended in 500 parts of water and the suspension is refluxed at atmospheric pressure for 2 hours, i.e., the solution is heated at 100° C. for 2 hours. The suspension is then cooled and refiltered, giving essentially pure terephthalic acid as a filter cake. The overall yield of terephthalic acid based on dipotassium terephthalate starting material in this example is 25.5% (mole basis). This example illustrates one embodiment of the precipitation and disproportionation reactions, conducted in a batchwise manner.

EXAMPLE III

A solution containing 121 parts of dipotassium terephthalate and 34.5 parts of potassium carbonate in 431 parts of water is agitated in the presence of carbon dioxide maintained at a pressure of 100 p.s.i.g. for 1 hour at 38° C. After venting, the effluent is filtered to give a 57% yield of monopotassium terephthalate. This example illustrates one embodiment of the precipitation reaction conducted in a batchwise manner.

EXAMPLE IV

A solution containing 121 parts of dipotassium terephthalate and 69 parts of potassium carbonate in 800 parts of water is treated with carbon dioxide as in Example II. Two liters of water at a temperature of 90° C. are poured through the filter cake over a period of about 5 minutes. The solid remaining on the filter is essentially pure terephthalic acid. Overall recovery of terephthalic acid based on dipotassium terephthalate starting material is 21.7% (mole basis). This example also illustrates the precipitation and disproportionation reactions.

EXAMPLE V

Example I is repeated except that 126 parts of sodium bicarbonate are used in place of potassium bicarbonate. Results of this example are substantially identical with those of Example I.

EXAMPLE VI

Example II is repeated except that 105 parts of disodium terephthalate and 53 parts of sodium carbonate are used instead of dipotassium terephthalate and potassium carbonate. Results are substantially identical with those of Example II.

EXAMPLE VII

Example I is repeated except that 102 parts of lithium bicarbonate are used in place of potassium bicarbonate. Results in this example are substantially the same as those of Example I.

EXAMPLE VIII

A mixture of 128 parts of terephthalonitrile, 250 parts of potassium bicarbonate and 500 parts of water is charged to an autoclave. The mixture is heated for 4 hours at a temperature of 175° C. while stripping the reacting mixture with 4 s.c.f. of nitrogen per hour per part of nitrile at a pressure of 150 p.s.i.g. in order to remove ammonia and carbon dioxide substantially as fast as they are evolved in the reaction. Water is periodically added to make up for the amount removed during this stripping operation. After 4 hours, analysis of the effluent gases from the stripping operation indicates that substantially no further ammonia is being evolved. Stripping gas flow is then discontinued and the reaction mixture is allowed to cool. Upon cooling to room temperature the reaction mixture is in the form of a homogeneous solution.

745 parts of the above prepared reaction mixture are heated to 40° C. and then contacted with carbon dioxide in an autoclave. The carbon dioxide pressure is maintained at 25 p.s.i.g. Reaction time is 2 hours. During the course of this reaction it is noted that a precipitate forms. After completion of this reaction, the reaction mixture, in the form of a slurry, is filtered to isolate the precipitate of substantially pure monopotassium terephthalate. The filter cake is washed with water at room temperature. In this manner, 75 parts of a solid monopotassium terephthalate filter cake are obtained.

75 parts of the filter cake, prepared as described above, are suspended in 1500 parts of hot water (temperature=130° C.) and agitated for 2 hours. The suspension, while still hot, is filtered and the filter cake is washed with two parts of hot water. In this manner 30.5 parts of a second filter cake are obtained. This filter cake is analyzed and found to be over 99.5% pure terephthalic acid.

EXAMPLE IX

Example VIII is repeated except that, instead of terephthalonitrile, 142 parts of 2-methyl-1,4-phenylene dinitrile are used. Comparable results are obtained.

EXAMPLE X

Example I is repeated except that in place of terephthalonitrile, 78 parts of 2,5-dimethylphenylene-1,4-dinitrile are used. An almost quantitative yield of the dipotassium salt of the acid corresponding to the dinitrile starting material is obtained.

EXAMPLE XI

The procedure of Example I is repeated except that the charge to the autoclave is 64 parts of terephthalonitrile, 200 parts of potassium bicarbonate and 1,000 parts of water. Results are comparable to those of Example I.

EXAMPLE XII

The procedure of Example I is again repeated with 128 parts of terephthalonitrile, 200 parts of potassium bicarbonate and 200 parts of water as the charge to the autoclave. Results are again comparable to those of Example I.

EXAMPLE XIII

A solution containing 121 parts of dipotassium terephthalate and 69 parts of potassium carbonate in 2,230 parts of water is agitated in the presence of carbon dioxide, maintained at a partial pressure of 21 p.s.i.g., for one hours at 20° C. The pressure is then released and the effluent is filtered to recover essentially pure monopotassium terephthalate as a filter cake.

EXAMPLE XIV

The procedure of Example XIII is repeated using a solution of 121 parts of dipotassium terephthalate, 69 parts of potassium carbonate and 295 parts of water. Carbon dioxide partial pressure is maintained at 100 p.s.i.g. and temperature is maintained at 45° C. for one hour. As in Example XIII, a filter cake of essentially pure monopotassium terephthalate is recovered.

The foregoing description illustrates the methods of this invention whereby the advantages thereof are obtained. It will be understood that modifications and variations thereof may be effected by those skilled in the art without departing from the spirit of our invention. Accordingly it is intended that all matter contained in the above description shall be interpreted as illustrative and not in a limiting sense.

Having described our invention, what we claim as new and desire to secure by Letters Patent is:

1. A continuous process for the conversion of an aromatic dinitrile, the nitrile groups of which are in para relation to each other, to the corresponding diacid, said process comprising the steps of:
   (a) reacting the nitrile in the liquid phase at a temperature from about 100° C. to about 250° C. with an aqueous solution of an alkali metal bicarbonate to form a hydrolyzate containing the alkali metal disalt of the diacid, the molar ratio of alkali metal bicarbonate to nitrile and nitrile derivative in the hydrolysis being from about 1:1 to about 5:1, the concentration of nitrile and nitrile derivative present in the hydrolysis being from about 5% to about 40% by weight;
   (b) removing ammonia and carbon dioxide, formed during the hydrolysis of the nitrile, from the hydrolyzate;
   (c) reacting the disalt-containing hydrolyzate, from which ammonia and carbon dioxide have been removed, at a temperature from above about 0° C. to about 100° C., with carbon dioxide to form a precipitate of the alkali metal monosalt of the diacid and a mother liquor which contains diacid salts and alkali metal bicarbonate, the partial pressure of carbon dioxide in the reaction being from about 15 p.s.i.a. to about 500 p.s.i.a., the concentration of the disalt in the reaction being from about 1% to about 30% by weight;
   (d) separating the precipitate from the mother liquor;
   (e) recycling the mother liquor to the hydrolysis step;
   (f) contacting said precipitate with from about 3 to about 100 parts of liquid water per part by weight of precipitate at a temperature from about 50° C. to about 150° C. for a time between about 2 minutes and about 120 minutes thereby disproportionating the precipitate to form the free diacid and the alkali metal disalt of the diacid;
   (g) separating the free acid formed during the disproportionation from the disalt formed therein;
   (h) recycling the disalt obtained in step (g) to the reaction of step (c); and,
   (i) recovering the free acid.

2. A process in accordance with claim 1 wherein the dinitrile is terephthalonitrile and the alkali metal is potassium.

3. A process in accordance with claim 1 wherein the dinitrile is a monomethyl substituted terephthalonitrile and the alkali metal is potassium.

4. A process in accordance with claim 1 wherein, in step (a), the temperature is within the range from about 150° C. to about 200° C., the molar ratio is within the range from about 2:1 to about 3:1 and the concentration is within the range from about 15% to about 25%.

5. A process in accordance with claim 1 wherein, in step (c), the temperature is within the range from about 20° C. to about 50° C. and the partial pressure is within the range from about 20 p.s.i.a. to about 75 p.s.i.a.

6. A process in accordance with claim 1 wherein, in step (f), the amount of water is from about 15 to about 100 parts per part of precipitate.

7. A process in accordance with claim 1 including the steps of separating the carbon dioxide formed in the hydrolysis from the ammonia also formed therein, recovering the carbon dioxide and using the so-recovered carbon dioxide in step (c).

References Cited

UNITED STATES PATENTS

| 3,393,220 | 7/1968 | Winnick et al. | 260—515 P |
| 2,927,130 | 3/1960 | Schutt | 260—515 |

FOREIGN PATENTS

| 1,101,390 | 3/1961 | Germany | 260—515 |

OTHER REFERENCES

Noller, C. R., "Chemistry of Organic Compounds," p. 144, 252–3, W. B. Saunders, (Philadelphia) 1957.

Wagner et al., "Synthetic Organic Chemistry," p. 412, J. Wiley (New York) 1953.

Groggins, Unit Processes in Organic Synthesis, 4th Ed. pp. 654–56 (1952).

LEWIS GOTTS, Primary Examiner

E. J. SKELLY, Assistant Examiner